INVENTOR
SAI HOI TSAO
BY
AGENT

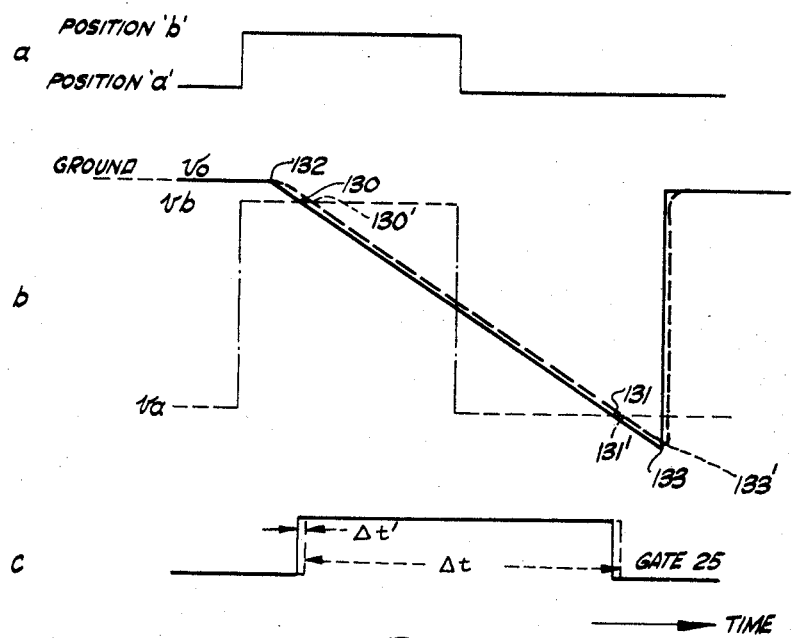
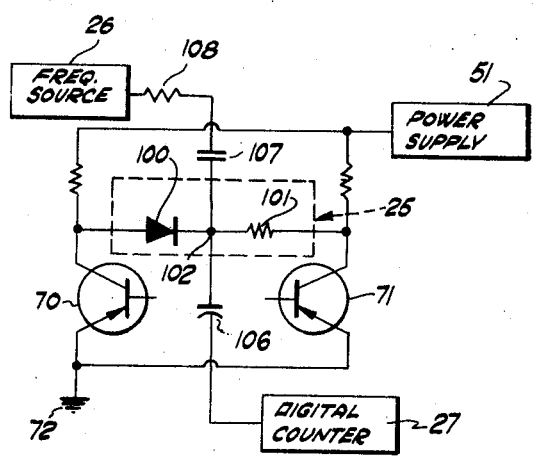

United States Patent Office 3,490,039
Patented Jan. 13, 1970

3,490,039
METHOD AND APPARATUS FOR MEASURING HIGH RESISTANCES IN RELATION TO RESISTANCE RATIO, CAPACITANCE, AND A TIME INTERVAL
Sai Hoi Tsao, Ottawa, Ontario, Canada, assignor to Canadian Patents and Development Limited, Ottawa, Ontario, Canada, a corporation of Canada
Filed Jan. 29, 1968, Ser. No. 707,908
Claims priority, application Canada, Feb. 23, 1967, 983,611
Int. Cl. G01r 27/02
U.S. Cl. 324—62
3 Claims

ABSTRACT OF THE DISCLOSURE

The value of an unknown high resistance may be measured in relation to the efluxation of time, the value of a capacitance, which may be fixed, and that of a resistance ratio. Each quality itself, that is time, capacitance and the resistance ratio in relation to which the unknown high resistance is measured is capable of measurement to reasonably high degree of accuracy with conventional means available in the present art. By reversing the voltage polarity across the capacitance and resistance ratio and hence reversing the direction of flow of current through the unknown resistance an averaging of the measurements of the value of the unknown high resistance is obtained. With judicial selection of the values of the capacitance resistance ratio the efluxation of time, which may be measured by a fixed frequency generator can be a direct measurement of the resistance in ohms.

---

This invention relates to a method and apparatus for measuring high resistances.

The Wheatstone bridge has long been accepted as an accurate means for calibrating resistances above $10^5$ ohms. More recently, its usefulness has been extended upwards to cover $10^{14}$ or $10^{15}$ ohms measurements. However, its accuracy for measurements above $10^{10}$ ohms suffers considerably due to the accumulated errors in the scaling process where intermediate high-resistance standards with significant temperature and voltage coefficients are involved, the diminution of system sensitivity or the presence of system noise and stray capacitance in the high-resistance bridge circuit. Typically, commercial units can achieve an accuracy of 0.25% at $10^{12}$ ohms.

Another method of calibrating resistances above $10^9$ or $10^{10}$ ohms is disclosed by Arnold H. Scott in vol. 50, #3, March 1953, of the Journal of Research of the National Bureau of Standards at pp. 147–152. This method involves the use of a variable capacitor accurately calibrated the capacitance of which is continuously decreased at a rate such that the potential across an unknown resistor (the resistance of which is to be measured) remains the same throughout the measurement as indicated by the null reading of an electrometer. The total charge that flows through the resistor in a known time is obtained from a knowledge of the change of charges in the capacitor system. The resistance is then calculable. Other methods require variable potentiometers to measure the charge that flows through the resistor.

These methods suffer from the disadvantage that they are time consuming and require continuous alteration of the value of resistance or capacitance in order to retain a fixed potential across the resistance being measured.

The invention therefore contemplates the measurement of an unknown high resistance in relation to values of capacitance, and resistance neither of which is altered during the measuring process.

The invention further contemplates an electrical circuit for determining the value of an unknown high resistance in relation to a time interval during which a given quantity of charge passes through the unknown high resistance. The circuit may provide for self-setting to a state of operational readiness when initially turned on, prior to any measurements being taken, as well as self-setting to the state of operational readiness after each measurement of resistance.

The invention achieves the measurement of the value of the unknown high resistance in relation to the effluxion of time during the measurement and the value of a capacitance and that of a resistance ratio. Each quantity itself (time, capacitance and resistance ratio), in relation to which the unknown high resistance is measured, is capable of measurement to a reasonably high degree of accuracy with conventional means. Further temperature effects on the values of capacitance can be nearly eliminated by careful design and selection of the type of capacitor used. Temperature effects and aging of resistors are substantially reduced by using a ratio of resistances. In this way temperature and aging effects will in general affect each resistor by the same amount thereby resulting in a greater stability in the value of the ratio of the resistances. Particularly, if the unknown high resistance has a value in the order of approximately $10^9$ to $10^{15}$ ohms, its actual value in ohms may be determined to an accuracy of better than 0.1% if the values of the resistance ratio and of the capacitance are known to 0.01%. Accuracy of measurement of the value of the unknown resistance may be enhanced by reversing the voltage polarities across the capacitance and resistance ratio (hence reversing the flow of direct current through the unknown resistance) and averaging the measurements of the value of the unknown resistance obtained. This reduces errors generated by amplifier offset currents.

Accordingly, the invention relates to a method of measuring high resistance in accordance with a mathematical function of the generalized form $$Rx = \frac{t(r)}{c}$$

where $Rx$ is a measurement of the value of an unknown high resistance, $c$ the value of a capacitance, $r$ the value of resistance ratio and $t$ a duration of time, comprising the steps of applying a constant voltage across the unknown high resistance to cause a current to flow through it, measuring the duration of time, during which the current alters the voltage across the capacitance by an amount which corresponds with the value of said constant voltage in a ratio equal to the resistance ratio.

More particularly the method involves the solution of the mathematical function of the form:

$$Rx = \frac{n(Ra)}{fc(Rb)}$$

wherein ($Ra/Rb$) is the unknown value of the ratio of two resistances $Ra$ and $Rb$, $n$ is a count during a time interval, $f$ a frequency Hertz, comprising the steps of applying a constant voltage across the unknown high resistance to cause a current to flow through it, counting the number of cycles of a fixed known frequency during the time in which the current alters the voltage on the capacitance by an amount which corresponds with the value of said constant voltage in a ratio equal to that of the two resistances.

This invention also contemplates an electrical circuit for determining the value of an unknown high resistance by measuring the time interval during which a given quantity of charge passes through said resistance said circuit including:

(a) An integrating amplifier for generating an output voltage, said amplifier including an input terminal for connecting through said high resistance to a source of constant voltage; and (b) Means connected to said output terminal for determining the time interval required for the output voltage from said output terminal to pass through a given excursion.

The invention further contemplates means for sensing the magnitude of the output voltage when in excess of the given excursion, and for resetting the output voltage to a magnitude less than the given excursion.

The invention will now be described, by way of example, reference being had to the accompanying drawings in which:

FIGURE 4 is a graph showing the operational time sequence of the apparatus; and

FIGURE 5 is a detailed schematic of the gate circuit in the environment of a generalized multivibrator circuit.

Figure 1:
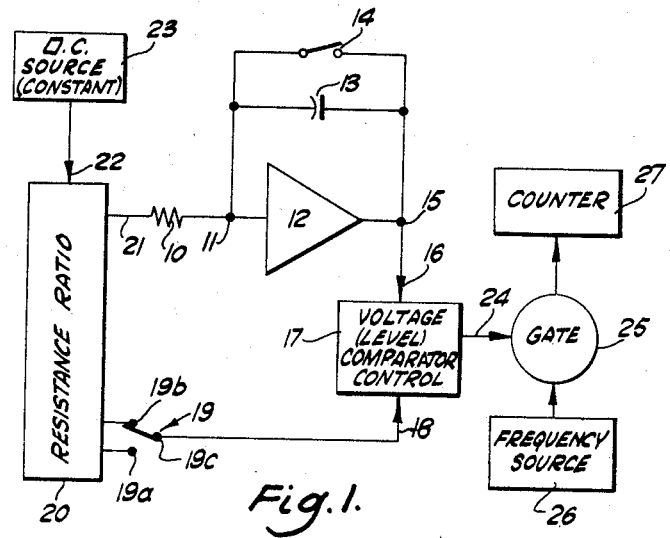
FIGURE 1 is a generalized block diagram of the apparatus.

Referring to FIGURE 1 a high resistance 10, of unknown value, is connected to the input 11 of an amplifier 12. An integrating capacitor 13, which preferably is a high quality capacitor having an air dielectric with D.C. guarding and A.C. shielding (also known as a three-terminal capacitor) shunts the amplifier 12. A switch 14, nominally in the close position, also shunts the amplifier 12. The integrated output voltage from the output terminal 15 of the amplifier 12 is fed to one input 16 of a voltage level comparator-control 17. The other input 18 of the voltage level comparator and control 17 is connected to the common terminal 19c of a 2-pole switch 19. Each of the poles 19a and 19b are connected to the resistance ratio 20 such that a first and second reference potential Va and Vb respectively appear between each pole 19a and 19b and ground. The resistance ratio 20 has terminal 21 connected to the unknown resistance 10. A terminal 22 of the resistance ratio 20 is connected to a source 23 of constant direct current. The output 24 of the voltage level comparator-control 17 is connected to a gate 25. A frequency source 26 is connected to the gate 25. The gate 25 permits the signal from the frequency source 26 to be read by a counter 27 between trigger pulses from the output 24 of the voltage level comparator-control 17.

Figure 2:
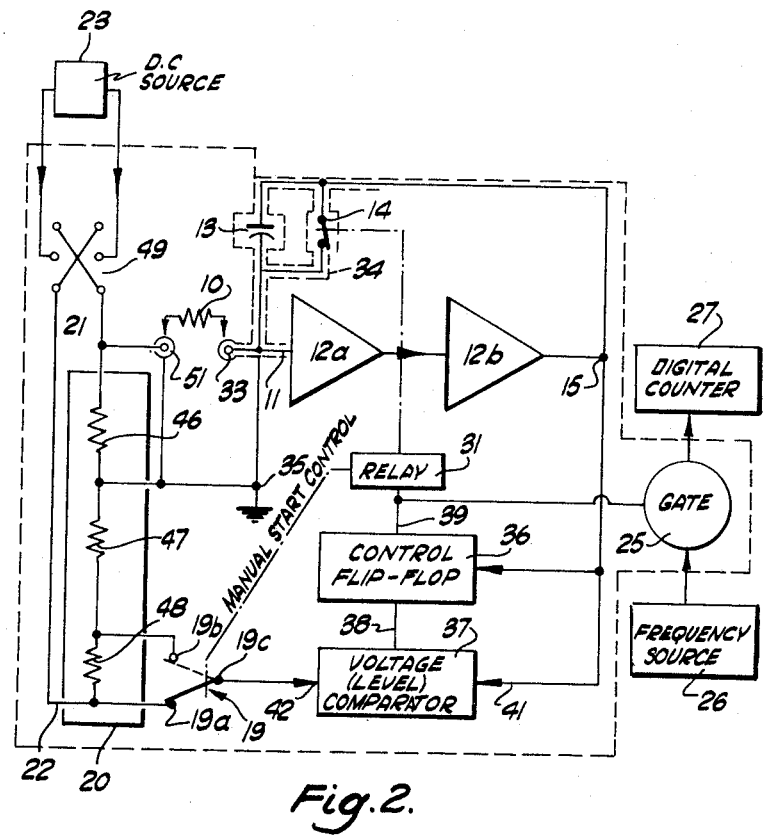
FIGURE 2 is a detailed block diagram of the apparatus of FIGURE 1.

Referring to FIGURE 2 the preferred embodiment of the invention includes two integrating amplifiers 12a and 12b in series, the fixed capacitor 13 connected parallel with the switch 14 of a relay 31; the switch 14 and the capacitor 13 shunt the amplifiers 12a and 12b. The input 11 to amplifier 12a connects to a resistor input terminal 33. The terminal 33 and the input 11 as well as the capacitor 13 and the switch 14 are shielded with an electrostatic shield 34 which is grounded at 35. The voltage level comparator-control 17 includes a bistable control flip-flop 36 and a voltage level comparator 37. The output 38 of the voltage level comparator 37 triggers the flip-flop 36. The output 39 of the flip-flop 36 is fed to the gate 25 and the relay 31. The voltage level comparator 37 includes two inputs 41 and 42. Input 41 connects to the output 15 of the amplifier 12b for receiving the integrated output voltage Vo, input 42 connetcts to the common terminal 19c of switch 19 for receiving the reference potentials Va or Vb. The relay 31 has a manual start control mechanism 43 connected to switch 19. The resistance ratio 20 includes three series resistors 46, 47 and 48. Across the resistor 48 terminals 19b and 19a of switch 19 are connected; as to terminal 19a the source of direct current 23 is connected through a reversing switch 49. The junction of resistors 46 and 47 is grounded at 35 while the free end of the resistor 46 is terminal 21 of the resistance ratio 20 to which are connected resistance terminal 51 and the direct current source 23 through a reversing switch 49.

Figure 3:
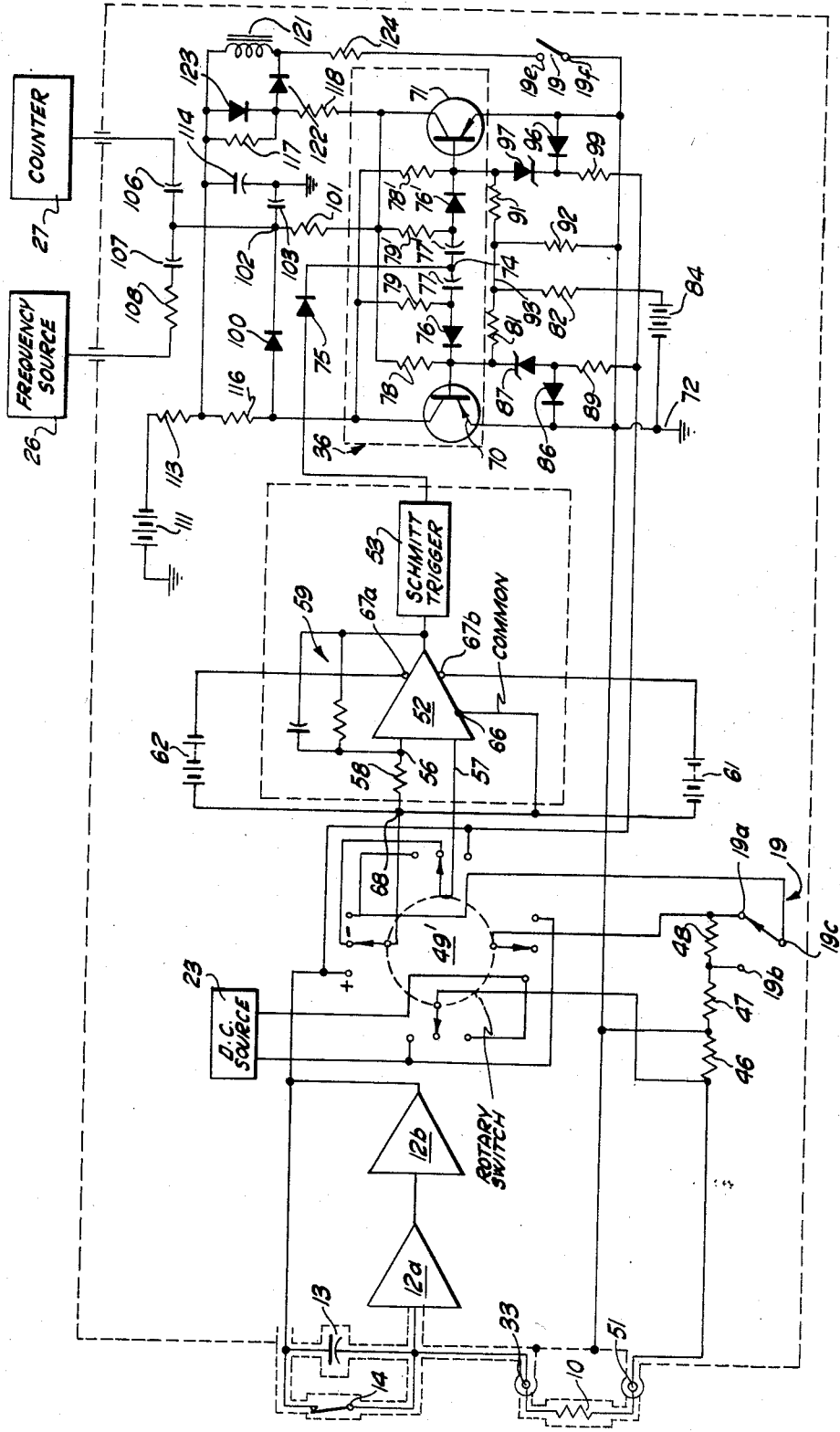
FIGURE 3 is a detailed block diagram of the apparatus of FIGURE 1 showing preferred embodiments of the voltage comparator and multivibrator circuits.

Referring now to FIGURE 3 a block diagram of the apparatus shows the detailed circuitry of the gate 25, the flip-flop 36 and the voltage level comparator 37; the latter including a differential amplifier 52 in cascade with a Schmitt trigger 53. The differential amplifier 52 has two input terminals 56 and 57. To input terminal 56, input resistor 58 and a resistor capacitor network 59 are connected. The network feeds back part of the output signal from the amplifier 52 for amplification stabilization. The free end of the resistor 58 is connected to the amplifier common terminal 66. This configuration provides a high input impedance between input terminals 57 and 68 and non-inverting amplification. The common mode rejection of the amplifier 52 is enhanced by "floating" the common terminal 66 of the amplifier 52 from ground. Reversed battery supplies 61 and 62 are placed between the common terminal 66 of the amplifier 52 and power supply terminals 67a and 67b of the amplifier 52. The common terminal 66 is also connected to a contact of a rotary reversing switch $49^1$. The other input terminal 57 of the amplifier 52 is connected to another contact on the rotary switch $49^1$. The output of the amplifier 52 is connected to the input of the Schmitt trigger 53 which is powered from the same floating supplies 61 and 62.

The flip-flop 36 includes two PNP transistors 70 and 71 in bistable configuration with the emitters grounded at 72. The flip-flop 36 has an input terminal 74 to which isolating capacitors 77 and $77^1$ are connected. To this input terminal 74 the signal from the Schmitt trigger 53 is fed through a silicon diode 75. To the capacitor 77 the anode of a diode 76 is connected while the cathode thereof is connected to the base of the transistor 70. In a like manner, the anode of a diode $76^1$ is connected to the capacitor $77^1$ while the cathode of the diode $76^1$ connects to the base of the transistor 71. The collector of the transistor 71 feeds the resistor 78 to the base of the transistor 70 and through a resistor $79^1$ to the anode of the diode $76^1$. Similarly the collector of the transistor 70 feeds through a resistor $78^1$ to the base of the transistor 71 and through a resistor 79 to the anode of a diode 76. A voltage divider network including resistors 82 and 92 which are connected to a source of positive potential 84 and to ground respectively, is used to supply current from the tie point 93 to the bases of transistors 70 and 71 through resistors 81 and 91 respectively.

The base of the transistor 70 is also connected to series resistances 81 and 82 and a source of positive potential 84, and a resistor-diode network which includes the cathode of a diode 86 grounded; its anode connected to that of a Zener diode 87. The cathode of the Zener diode 87 is connected to the base of the transistor 70. The network is completed by a resistor 89 connecting the anodes of the diodes 86 and 87 to the output of the amplifier 12b.

The base of transistor 71 is likewise connected to a second resistor-diode network (the polarity of the diodes being reversed), as well as series resistances 91 and 92 to ground at 72. (It will be noted that the series substances 82 and 92 form a voltage divider between the battery 84 and ground to provide at point 93 a voltage source for the base of each transistors 70 and 71 through resistors 81 and 91 respectively.) The resistor-diode network includes the anode of a diode 96 grounded; the cathode is connected to that of the Zener diode 97, and the anode of the Zener diode is connected to the base of the transistor 71. The network is completed by a resistor 99 connecting the cathodes of the diodes 96 and 97 to the output terminal of the amplifier 12b.

The gate 25 includes a diode 100 and resistor 101 shunting the collectors of the transistors 70 and 71. The diode 100 is interconnected between the collector of the transistor 70 and a tie point 102. To this tie point 102 a transient-shunting capacitor 103 is connected to ground, and the resistor 101 is connected from the tie point 102 to the collector of the transistor 71. The tie point 102 also feeds through an isolating capacitor 106 to the counter 27 and is fed through an isolating capacitor 107 and signal-dropping resistor 108 by the frequency source 26.

A source of negative potential 111 powers the transistor 70 and 71. The negative potential 111 feeds through a filtering network of resistor 113 and capacitor 114, a load resistor 116 being the collector load resistor of the transistor 70 and series resistors 117 and 118 being the load for the collector of the transistor 71. An operational relay 31 activates the switch 14, the relay coil 121 being in series with the diode 122. The relay coil 121 and diode 122 are connected across the resistor 117 and shunt with another diode 123 such that the cathode of the diode 123 feeds the anode of the diode 122. The cathode of the diode 122 feeds through a resistor 124 to contact 19e of a push-button control switch 19, the other contact 19f being grounded at 72.

The sequence of operations necessary in order to obtain a measurement of high resistance is best understood by referring to FIGURES 1 and 4. FIGURE 4 graphically illustrates the time sequence of operation subsequent to the opening of switch 14. FIGURE 4(a) shows the timing sequence of switch 19; in FIGURE 4(b) the output voltage $V_o$ of the amplifier 12 as a function of time is illustrated, the theoretical ideal response represented by the solid line 132, 130, 131, 133 and the actual response by the dotted line 132, $130^1$, $131^1$, $133^1$. The output voltage $V_o$ is overshadowed by the dotted lines $V_a$ and $V_b$ which represent reference potentials presented to the voltage level comparator-control 17 (voltage level comparator 37 in FIGURE 2) as a result of the position of the switch 19; FIGURE 4(c) shows the gating interval $\Delta t$ of the gate 25, which is postponed by a delay time $\Delta t^1$ (the actual gating interval $\Delta t$ being represented by the dotted line and the theoretical by the solid line). The actual gating interval $\Delta t$ is postponed by the delay time $\Delta t^1$ for reasons which will become more apparent.

Now describing the operation of the embodiment of the invention disclosed, nominally the switch 14 is closed short circuiting the amplifier 12 and shunting capacitor 13, the latter two elements constituting an integrating amplifier. When the switch 14 is opened, this instantaneous time being represented by point 132 in FIGURE 4, the amplifier 12 starts to integrate. Integration continues during the time interval that the switch 14 is open and terminates when the switch 14 is closed, points 133 and $133^1$. As previously noted, the output voltage $V_o$ of the integrating amplifier 12 is theoretically represented by the solid line of FIGURE 4(b), the points 132 and 133 representing the time at which the switch 14 is opened and closed. Practically; however, the amplifier 12 has a finite band width, rather than an infinite one, and will not generate an output voltage which is discontinuous in time. As a result, when switch 14 is opened and the amplifier 12 commences to integrate (point 132), the output voltage $V_o$ variation is continuous in time. This output voltage $V_o$ is represented by the dotted line of FIGURE 4(b), where rounding off of the theoretical voltage discontinuity occurs between points 132 and $130^1$. Similarly, on closing the switch 14, rounding off of the output voltage curve will occur at $133^1$. It is readily seen that the finite band width also postpones the gating interval $\Delta t$ by a delay time $\Delta t^1$.

When the switch 14 is opened and the amplifier 12 integrates, the output voltage $V_o$, which follows the dotted line of FIGURE 4(b), will be constantly compared by the voltage level comparator-control 17 with a first reference voltage $V_b$ derived from the current flowing through the series resistance 20; the voltage $V_b$ being generated by the voltage drop of the current passing through the resistor 47 (see FIGURE 2), the switch 19 having been thrown to pole 19b. When the voltages mutually coincide, $V_o = V_b$, the voltage level comparator-control 17 triggers gate 25 open to allow the counter 27 to count the pulses generated by the frequency source 26. This sequence of events occurs at point $130^1$ (theoretically 130). The switch 19 is then tripped to its other pole 19a. This causes a second reference potential $V_a$ to appear at the input 18 of the voltage level comparator-control 17, the second reference potential $V_a$ being generated by the current flowing through resistors 47 and 48. When the output voltage of $V_o$ of the amplifier 12 coincides with this second reference potential $V_a$, $V_o = V_a$, point $131^1$, a pulse is again generated by the comparator 17 and the gate 25 is shut. The switch 14 is then closed, point $133^1$, to stop integration.

In operation the device of FIGURE 2 functions identically as that of FIGURE 1. The unknown resistor 10 is placed between terminals 33 and 51. A manual button (not shown) places switch 19 in position such that reference voltage $V_b$ appears at the input 42 of the comparator 37 and relay 31 is energized (through the closing of switch contacts 19e and 19f in FIGURE 3) opening switch 14 to initiate integration. The output voltage $V_o$ of the amplifier 12b follows the curve $V_o$ of FIGURE 4(b). When $V_o = V_b$, point $130^1$, the voltage comparator 37 triggers the flip-flop 36 to hold relay 31 energized (in a manner which will be more clearly described) and the gate 25 opens for the signal from the frequency source 26 to activate the counter 27. The switch 19 is then switched to position 19a such that reference voltage $V_a$ appears at input 42 of the comparator 37. When $V_o = V_a$, point $131^1$, the comporator 37 triggers the flip-flop 36 shutting the gate 25 and de-energizing the relay 31 to close the switch 14. (The closing of the switch 14 is illustrated as point $133^1$ in FIGURE 4.) The closing of the gate 25 isolates the counter 27 from the signal source 26. Due to the inherent time delay of relay 31 the closing of the switch 14, point $133^1$ occurs after the closing of the gate 25, point $131^1$. By using a single voltage level comparator 37 to sense the equality between $V_o = V_a$ and $V_o = V_b$, any error which is inherent in the one determination of voltage equality, i.e. $V_o = V_a$, will be inherent in the other determination i.e. $V_o = V_b$, with the result that the effect of the error will be cancelled.

Preferably the values of $V_a$ and $V_b$ are selected such that $V_b$ and $V_a$ have a magnitude in excess of $V_o$ when switch 14 is closed. That is the output voltage $V_o$ of the integrating amplifier 12b while the switch 14 is closed (no integrating taking place) is initially less than $V_b$ and $V_a$, and preferably equal to zero volts. Similarly $V_b$ and $V_a$ preferably have a magnitude of 0.2 and 1.2 volts respectively. As a result, when switch 14 is opened and integration commences, the gate 25 will not open until $$V_o = V_b = 0.2$$

volt. This is sufficient time for the amplifier 12 to round off the discontinuity and when $V_o = V_b$ (point $130^1$) the gate 25 opens and the counter 27 counts the signal generated by the frequency source 26. During integration, switch 19 is thrown and $V_a$ presents itself to the voltage level comparator 37. When $V_o = V_a = 1.2$ volts i.e., point $131^1$ the gate 25 is closed and counting stops. The reading on the counter 27 represents a measurement of the value of the unknown high resistance. Integration continues until point $133^1$ is reached and the switch 14 is closed thereby shorting the output of the amplifier 12 to its input. This resets $V_o$ practically to zero volts.

Referring to FIGURE 5, the operation of the gate 25 will now be described. When the transistors 70 and 71 are connected as in a saturated multivibrator, one transistor will conduct heavily while the other will not be conducting. If transistor 70 conducts the collector thereof will be almost at ground potential as will the anode of diode 100. Likewise the cathode thereof because diode 100 now conducts. This places junction point 102 at substantially ground potential provided the polarity of the diode 100 and the type of transistors 70 and 71 are proper. When transistor 71 conducts, transistor 70 is not conducting. This results in substantially all the voltage of the power supply 51 appearing across the transistor 70, while none appears across the transistor 71. This effectively blocks diode 100 and effectively shunts junction 102 to ground through resistor 101. It is now obvious that any signal at junction 102 will be grounded during the conduction of transistor 70 and exists during conduction of transistor 71. As a result, the signal from the frequency source 26 will appear at the digital counter 27 during conduction of transistor 71 but not during conduction of transistor 70.

Now referring to FIGURE 3 the Schmitt trigger 53 always provides a positive pulse to junction point 74. Assuming that the transistor 70 is conducting, the gate 25 is closed and the counter 27 does not count. When the push-button switch 19 is pressed close, contact 19c makes contact with 19b and the voltage Vb is applied to the differential amplifier 52. The relay coil 121 conducts as contact 19f mates with 19e, and the switch 14 opens. Integration starts (point 132 on the graph of FIGURE 4). When $Vo=V$, point $130^1$ of the graph is reached. The Schmitt trigger 53 provides a positive pulse to the point 74 and hence to the base of the transistor 70. The transistor 70 stops conducting; the transistor 71 conducts heavily. The junction point 101 now is no longer effectively grounded through diode 100 and as a result, the counter 72 counts the frequency emission of the frequency source 26; or in other words, the gate 25 is open. When the push-button switch 19 is released, contact between 19e and 19f is opened, and the contact 19c mates with that of 19a causing the reference voltage Va to be applied to the differential amplifier 52. Since the transistor 71 still conducts, the relay coil 121 is still energized by the passing of a current from the source 111 through the coil 121, the diode 122, the resistor 118 and the conducting transistor 71 to ground. When $Vo=Va$, the Schmitt trigger 53 triggers the transistor 70 to conduction and the gate 25 closes and the counting of the counter 27 stops. Thereafter, the switch 14 closes due to the de-energizing of the relay coil 121 since transistor 71 stops conducting. This stops the integration, and resets Vo to zero.

Let us now assume that when the apparatus of FIGURE 3 is initially turned on, that transistor 71 is conducting. As a result, the relay coil 121 will be energized and the amplifiers 12a and 12b will be integrating. The magnitude of the resultant output voltage Vo will be increasing and if the magnitude of the output voltage Vo is greater than that of Va then the integration will continue until Zener diodes 87 or 97 break down (depending upon the polarity of the output voltage Vo). On the breakdown of either Zener diode 87 or 97 the transistor 70 will commence to conduct and the relay coil 121 will be de-energized; the integration will stop and the output voltage Vo will be set to zero. This ensures that the apparatus is self-setting to a state of operational readiness.

The diodes 86 and 96 isolate the output voltage Vo and prevent the transistor 71 from conducting as a result of that voltage. The diodes 122 and 123 prevent transient voltages from appearing across the transistor 71 when the contacts 19f and 19e mate to energize the relay coil 121.

To improve accuracy, the rotary switch $49^1$ provides for reversing the connections to the two inputs 68 and 57 of the differential amplifier 52 in co-operation with the reversing of the direction of current flow from the D.C. source 23 and the polarity of the output voltage Vo of the amplifiers 12a and 12b. These coupled reversals will maintain the differential amplifier 52 and the Schmitt trigger 53 at identical working conditions thereby minimizing common-mode errors irrespective of whether integration by the amplifiers 12a and 12b proceeds negatively or positively. Normally, measurements of the unknown high resistance 10 are made for integration both negatively and positively. The two readings obtained are averaged. By this technique the leakage current (offset current) into the input 11 of the amplifier 12a is averaged out, as is the common-mode errors of the differential amplifier 52.

It should be noted that resistance 46 must have a value which is many times smaller than that of the unknown resistance 10, that is a value in the order of $10^{-4}$ times that of resistance 10 or smaller. Further the capacitor 13 should have a value greater than about 40 pf. to ensure reasonable accuracy in its determination. If a direct resistance reading (modified by a multiplicative range factor) from the counter 27 is desired the following conditions should prevail, for example, if a $10^{11}$ ohm resistor is to be measured then:

standard frequency $f=10$ kHz.
resistor 47=200 ohms
resistor 48=1K ohms
resistor 46=1K ohms
(voltage differential between Va and Vb=1 volt)
capacitance of capacitor 13=100 pf.
D.C. source 1 milliampere The corresponding multiplicative range factor will be $1\times10^6$.

The amplifier 12a should have a very high input resistance (larger than $10^{14}$ ohms) a small input offset current (less than $2\times10^{-14}$ amperes) and a gain of about 1 followed by an amplifier (12b) having a negative voltage amplification factor of about 4000 or more. If these requirements are satisfied, and the values of the capacitor 13 and of the ratio of the resistances, 46/48, (Ra/Rb) are known to 0.01% and if the leakage across the capacitor introduces an error of less than 0.04% then accuracy of 0.1% in the measurement of the value of the unknown high resistance 10 may be obtained. An accuracy of 0.06% in the measurement of the value of the unknown high resistance is obtainable when the leakage error is eliminated by D.C. guarding techniques in the fabrication of the capacitor 13.

I claim:

1. A method of measuring high resistance in accordance with a mathematical function of the generalized form:

$$Rx = \frac{N}{fc}\frac{Ra}{Rb} = \frac{\Delta t}{c}\frac{Ra}{Rb}$$

wherein (Ra/Rb) is a known value of the ratio of the two resistances Ra and Rb, N is a count of cycles of frequency f during a time interval $\Delta t$, and c is a capacitor of known capacitance value comprising the steps of applying a constant current to a series resistance chain including resistances Ra and Rb, obtaining a constant voltage related to resistance Ra, applying this voltage to the unknown resistance to be measured and an integrating amplifier in series, said amplifier including capacitance C in its feedback loop, applying the output of said amplifier to a voltage comparator, obtaining first and second voltage reference levels whose difference is related to resistance Rb and applying these serially to the said voltage comparator, and measuring the time interval $\Delta t$ required for the output voltage of the integrating amplifier to pass from the said first reference voltage level to the second reference voltage level, said time interval being a measure of the unknown resistance as defined by said equation.

2. An electrical circuit for determining the value of an unknown high resistance by measuring the time interval during which a given quantity of charge passes through said resistance said circuit comprising:
(a) an integrating amplifier for generating an output voltage, said amplifier including an input terminal for connecting through said high resistance to a source of constant voltage and an output terminal, and
(b) means connected to said output terminal for determining the time interval required for the output voltage from said output terminal to pass through a given excursion, said means including:
  (i) means for generating first and second reference voltages,
  (ii) a voltage level comparator connected to the output terminal for comparing the voltage at the output terminal with said first and second reference voltages and to provide a pulse when the voltage at the output terminal is of equal magnitude to that of either of the reference voltages,
  (iii) a digital counter,
  (iv) a source of timing pulses of known frequency,
  (v) a gate connected to the pulse source and to said digital counter to permit the counter to count the number of timing pulses from said source when the gate is open, and
  (vi) a control flip-flop connected between said voltage comparator and said gate for opening said gate and subsequently closing said gate on the series of pulses such that the time interval required for the output voltage of the integrating amplifier to pass through the given excursion may be determined, said time interval being related to the value of the high resistance.

3. The apparatus of claim 2 wherein the means for generating first and second reference voltages includes a series chain of resistances connected to a constant current source.

References Cited
UNITED STATES PATENTS

| | | |
|---|---|---|
| 2,504,848 | 4/1950 | Kunz. |
| 2,895,052 | 7/1959 | Weisglass et al. |
| 3,310,737 | 3/1967 | Ripper. |

FOREIGN PATENTS

| | | |
|---|---|---|
| 130,557 | 3/1959 | U.S.S.R. |
| 682,934 | 3/1964 | Canada. |

EDWARD E. KUBASIEWICZ, Primary Examiner

J. M. HANLEY, Assistant Examiner